(12) United States Patent
Gregar et al.

(10) Patent No.: US 8,584,551 B2
(45) Date of Patent: Nov. 19, 2013

(54) RAILROAD HANDBRAKE CHAIN TENSION CONDITION SENSING DEVICE AND METHOD

(75) Inventors: Peter Gregar, Chesterton, IN (US); Jonathon Marlow, Hobart, IN (US)

(73) Assignee: WABTEC Holding Corp, Wilmerding, PA (US)

( * ) Notice: Subject to any disclaimer, the term of this patent is extended or adjusted under 35 U.S.C. 154(b) by 176 days.

(21) Appl. No.: 13/028,480

(22) Filed: Feb. 16, 2011

(65) Prior Publication Data

US 2012/0204655 A1 Aug. 16, 2012

(51) Int. Cl.
*G05G 1/08* (2006.01)
*B60T 17/22* (2006.01)
*B61H 13/00* (2006.01)

(52) U.S. Cl.
USPC ............. 74/506; 74/505; 74/507; 188/1.11 R; 188/33

(58) Field of Classification Search
USPC .......................... 188/11.1 R, 33; 74/505–508
See application file for complete search history.

(56) References Cited

U.S. PATENT DOCUMENTS

| | | | |
|---|---|---|---|
| 4,714,142 A | 12/1987 | Shepherd | |
| 6,029,798 A | 2/2000 | Miller | |
| 6,170,619 B1 | 1/2001 | Sheriff et al. | |
| 6,237,722 B1 | 5/2001 | Hammond et al. | |
| 6,474,450 B1 | 11/2002 | Ring et al. | |
| 6,474,451 B1 | 11/2002 | O'Brien, Jr. | |
| 7,757,825 B2 | 7/2010 | Michel | |
| 7,878,309 B2 | 2/2011 | Michel et al. | |
| 2004/0150259 A1 | 8/2004 | Michel et al. | |
| 2010/0062900 A1 | 3/2010 | Michel | |

*Primary Examiner* — Lisa Caputo
*Assistant Examiner* — Jonathan Dunlap
(74) *Attorney, Agent, or Firm* — James Ray & Assoc (57) ABSTRACT

Chain tension sensing device includes a hollow enclosure, a sensor mounted in a stationary position within enclosure and a member mounted for a reciprocal movement in a substantially linear direction relative to the sensor. The member includes a chain engaging first portion, a second portion mounted for reciprocal movement and a sensor target disposed on a distal end of the second portion. A compressible resilient member is mounted in abutting engagement with at least a rear surface of the first portion. Chain take-up attains tension thereon generating force and moving the member towards the sensor so as to position the sensor target in operative sensing alignment therewith. Chain let-up causes the compressible resilient member to move the member in an opposite direction, removing the sensor target from the operative sensing alignment with the sensor. Sensor generates a control signal in response to sensing or not sensing the sensor target.

23 Claims, 4 Drawing Sheets

RAILROAD HANDBRAKE CHAIN TENSION CONDITION SENSING DEVICE AND METHOD

CROSS-REFERENCE TO RELATED APPLICATIONS

This application is closely related to a co-pending Regular Utility patent application Ser. No. 13/028,454 titled "DEVICE AND METHOD FOR SENSING APPLIED CONDITION OF A RAILROAD HANDBRAKE" filed concurrently herewith. The teaching of such co-pending application is incorporated herein by reference thereto.

FIELD OF THE INVENTION

The present invention relates, in general, to chain tension sensing devices and, more particularly, this invention relates to device and method for directly sensing tension condition of a force-producing chain of a railroad handbrake, and yet more particularly, the instant invention relates to a sensor mounted below a housing of the railroad handbrake and sensing generally linear movement of a member directly engaging force-producing chain.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

As is generally well known, each railcar has a handbrake which utilizes a force-producing chain being manually taken-up or let-up for setting and releasing brakes of the railcar. One of the disadvantages of using handbrakes with which the instant invention is concerned is that some handbrakes within a train consist are not being released prior to train consist movement resulting in wheel lock-ups and further resulting in wheel flats that require repair or even replacement of the entire wheel.

Prior to the conception and development of the present invention, efforts have been made to sense condition of the railcar brakes and/or the handbrake operation wherein the chain has been at least partially set or has not been released, by sensing the tension in the force-producing chain of the railroad handbrake. U.S. Pat. No. 6,474,451 issued to O'Brien, Jr. on Nov. 5, 2002, U.S. Pat. No. 6,237,722 issued to Hammond et al. on May 29, 2001, and U.S. Pat. No. 6,170,619 issued to Sheriff et al. on Jan. 9, 2001 teach various devices for sensing the force-producing chain being in released or "OFF" position.

However, there is a further need for a device and method that can be used for determining when the force-producing chain has been at least partially taken-up to set the railcar brakes.

SUMMARY OF THE INVENTION

The invention provides a device for sensing a tension condition of a force-producing chain, particularly employed in combination with a railroad handbrake. The device includes a generally closed hollow enclosure mounted in a stationary position to one bottom corner of the housing. The enclosure has each of an abutment disposed on and secured to an inner surface of a chain facing wall, a first aperture formed through a thickness of each of the chain facing wall and the abutment and a second aperture formed through a pair of spaced apart opposed walls of the housing. The pair of opposed walls disposed generally perpendicular to the chain facing wall. The second aperture is disposed in general alignment with an aperture formed through one bottom corner of the housing. An elongated brace is also provided and has a proximal end thereof disposed on and secured to an outer surface of the enclosure and has a distal end thereof positioned for engagement with an opposed bottom corner of the housing. The distal end has an aperture formed through a thickness thereof and aligned with an aperture formed through the opposed bottom corner of the housing. A lubricating liner has an outer surface thereof engaging a periphery of the first aperture. A sensor is mounted within the enclosure and has an opening disposed in general alignment with the first aperture and defining a generally U-shaped cross-section of the sensor in a plane transverse to a length thereof. A unitary one-piece member is mounted for a reciprocal movement in a substantially linear direction relative to the sensor. The member includes a first portion having a substantially flat rear surface disposed so as to face the sensor and an opposed front surface having a convex shape in a generally vertical plane when the device is mounted adjacent the railroad handbrake. An elongated second portion has a proximal end thereof disposed generally centrally on and secured to the rear surface, the second portion extending outwardly from the rear surface generally perpendicular thereto, the second portion has a peripheral surface thereof disposed in a generally abutting engagement with an inner surface of the lubricating liner. A sensor target is disposed generally centrally on and secured to a distal end of the elongated member. There is also a compressible resilient elastomer being caged between the rear surface of the first portion of the member and an outer surface of the chain facing wall of the housing, the compressible resilient elastomer having a center aperture axially formed therethrough, the center aperture is sized so as to pass the elongated second portion of the member therethrough. A unitary one-piece chain guide is manufactured from a self-lubricating material and includes a chain engaging surface having each of a convex shape in a generally vertical plane when the device is mounted adjacent the railroad handbrake and a concave shape in a generally horizontal plane, an opposed surface shaped and sized so as to abuttingly engage the convex front surface of the first portion of the member, a pair of mounting flanges spaced apart in the generally vertical plane and extending from the opposed surface of the chain guide, and a pair of tabs, each of the pair of tabs disposed on a distal end of a respective mounting flange and extending inwardly therefrom for engagement with the rear surface of the first portion. In operation, take-up of the force-producing chain during at least partial handbrake application moves the member from its original position in a direction towards the sensor and positions the sensor target within the opening of the sensor in operative sensing alignment therewith. Let-up of the force-producing chain during handbrake the release causes the compressible resilient elastomer to move the member in an opposite direction back to the original positions and removes the sensor target from the operative sensing alignment with the sensor. The sensor generates a control signal in response to sensing or not sensing the sensor target.

The invention also provides a method for sensing at least partially applied condition of a railroad handbrake. The method includes the steps of mounting a member for each of engagement with a force-producing chain and a reciprocal movement in a generally linear direction. Next, mounting a sensor in proximity to a lower end of a housing of the railroad handbrake in a position to sense the generally linear movement of the member during at least partial handbrake application. Then, moving the member in the generally linear direction. And, finally, sensing the generally linear movement of the member during the at least partial handbrake application.

OBJECTS OF THE INVENTION

It is, therefore, one of the primary objects of the present invention to provide a device for directly sensing tension condition of a force-producing chain of a railroad handbrake.

Another object of the present invention is to provide a railroad handbrake chain sensing device that includes a member mounted for each of engagement with a chain and a reciprocal movement in a generally linear direction and a sensor positioned to sense the generally linear movement.

Yet another object of the present invention is to provide a railroad handbrake chain sensing device that can be attached directly to railroad handbrake housing.

A further object of the present invention is to provide a railroad handbrake chain sensing device that can be retrofitted on the railroad handbrakes presently in use.

Additional object of the present invention is to provide a method for sensing applied condition of a railroad handbrake using the aforementioned device.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

The present invention describes a device and method for directly sensing tension or lack thereof in an elongated force-producing member including but not limited to chain, belt, wire, chord and the like.

The present invention is illustrated and described in combination with a railroad handbrake, generally designated as 10. Such railroad handbrake 10 may be of the type as described and taught in U.S. Pat. No. 4,368,648 issued to Housman et al. and owned by the assignee of the instant invention, although it will be apparent to those skilled in the relevant art that the present invention may be applied to other railroad handbrake type employing a force-producing chain and a manually operated rotating hand wheel and as such should not be interpreted as a limiting factor of the railroad handbrake of the instant invention. Teachings of U.S. Pat. No. 4,368,648 are incorporated into this document by reference thereto. In the railroad handbrake, the force-producing chain has been either taken up or let up during handbrake application for respectively at least partially setting or rereleasing brakes of a railroad railcar.

The best mode for carrying out the invention is presented in terms of its presently preferred and alternative embodiments, herein depicted within FIGS. 1 through 4. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the instant invention can be easily incorporated into the teachings thereof.

Now in a particular reference to FIGS. 1-4, therein is illustrated a handbrake 10 for railroad railcars (not shown). Briefly, the handbrake 10 comprises a generally hollow housing 14 having a pair of apertures 17 formed though each of a bottom corner 15*a*, 15*b* of the housing 14. A force-producing chain 37 extends from the housing 14 for connection, at one end thereof, to railcar brake rigging (not shown) and can be either taken-up for setting railcar brakes (not shown) or let-up for releasing the railcar brakes (not shown). Take-up of the force-producing chain 37 results in attainment of tension thereon.

There is a device, generally designated as 200, which provides means to directly sense a tension condition wherein a force-producing chain 37 of the railroad handbrake 10 has been either taken-up or let-up during handbrake application for respectively at least partially setting or rereleasing railcar brakes (not shown). One essential element of the instant invention is a member, generally designated as 210, which is mounted adjacent to bottom end to the housing 14 for a substantially linear movement during handbrake application and release. Another essential element of the instant invention is a sensor 240 mounted in a position to sense the substantially linear movement of the member 210.

The member 210 includes a first portion 212 having a substantially flat rear surface 214 disposed so as to face the sensor 240 and an opposed front surface 216. The front surface 216 may be so positioned that it abuttingly engages the force-producing chain 37 at least during railroad handbrake application. Preferably, the first portion 212 of the member 210 is elongated in a generally vertical plane when the device 200 is mounted adjacent the railroad handbrake 10. The front surface 216 of the first portion 210 may have a convex or any other curved shape in such generally vertical plane.

A second portion 220 of the member 210 has a proximal end 222 thereof disposed generally centrally on and secured to the rear surface 214. The second portion 220 extends outwardly from the rear surface 214 generally perpendicular thereto. Preferably, the second portion 220 is elongated and is essentially a cylinder, either hollow or solid. Preferably, the first portion 212 and the second portion 220 are formed integral with each other and wherein the member 210 is a unitary one-piece member.

Figure 3:
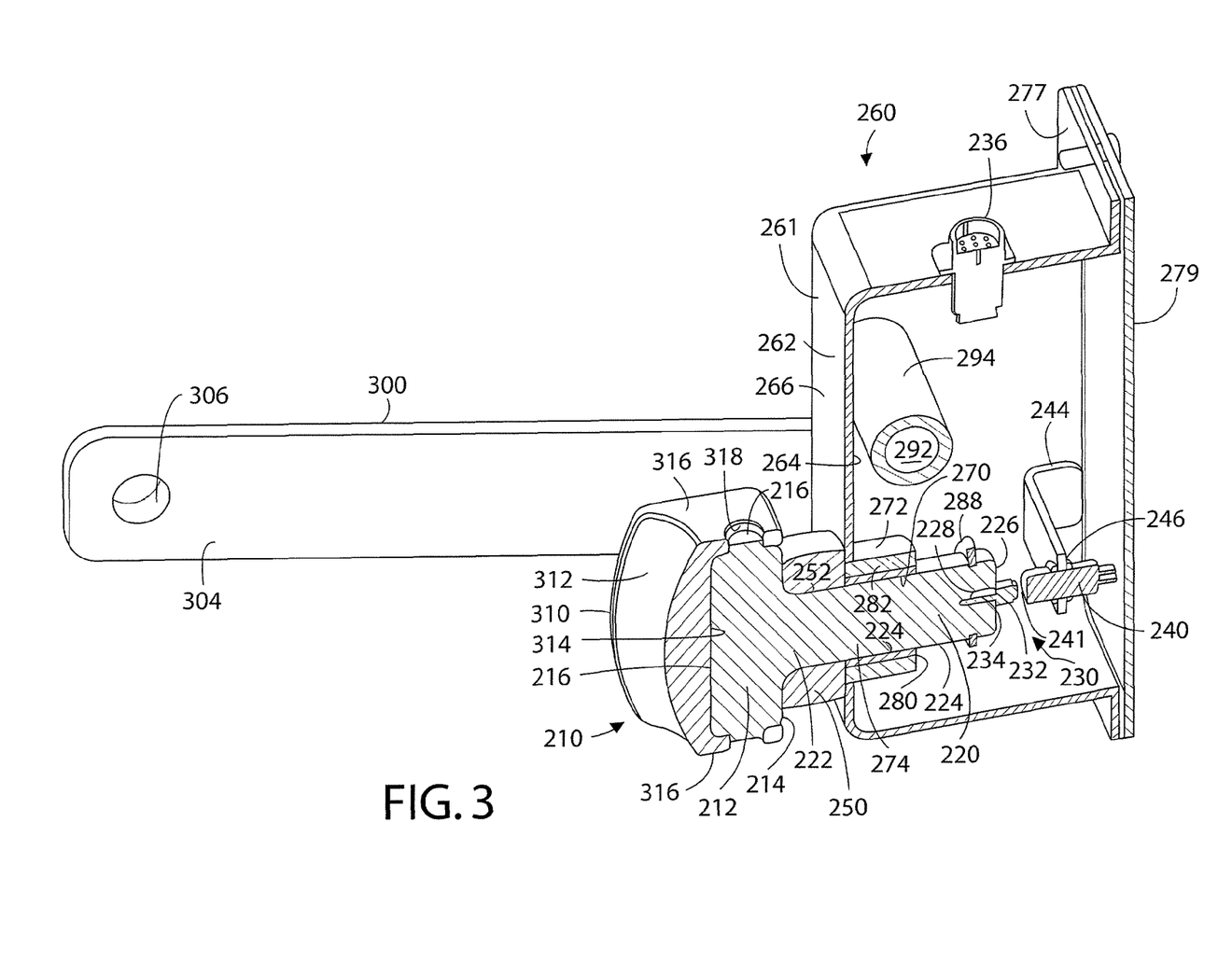
FIG. 3 is a perspective cross-sectional view of the device along lines III-III of FIG. 1.

A sensor target 230 is provided and is disposed generally centrally on and secured to a distal end 226 of the second portion 220.

The sensor 240 may be of any type and, preferably, the sensor 240 is of a non-contact proximity type. It is further presently preferred for the sensor 240 to be of a reed switch type with the sensor target 230 essentially being at least partially a magnet that causes the internal contacts of the switch to pull together and complete electrical circuit (not shown). The advantage of the reed type switch in this application is in that no power is required to operate the sensor 240.

The presently preferred sensor target 230 is manufactured by Cherry Corporation of Pleasant Prairie, Wis. under Part Number AS101001 and the presently preferred sensor 240 is also manufactured by Cherry Corporation under the MP2007 series. Such sensor target 230 includes a magnetic head 232 and a threaded stem 234 extending axially therefrom. The threaded stem 234 operatively engages a threaded bore 228 axially formed in the distal end 226 of the elongated second portion 220.

There is also a compressible resilient means 250 which is mounted in abutting engagement with at least the rear surface 214 of the first portion 212. The compressible resilient means 250 is preferably an elastomer having a center aperture 252 axially formed through a thickness thereof. Aperture 252 is sized so as to operatively pass the elongated second portion 220 of the member 210 therethrough.

Briefly, in operation, take-up of the force-producing chain 37 during at least partial handbrake application generates tension thereon, causing the force-producing chain 37 to apply predetermined force onto the first portion 212 generally perpendicular to the direction of the force-producing chain 37. The tension and resulting force are predetermined based on a particular application indicative of the at least partially taken-up condition of the force-producing chain 37 and defining that the railcar brakes have been at least partially set. The tension and resulting force are further predetermined based on a particular application so as to substantially eliminate false indications. When such predetermined tension is attained, the predetermined force moves the member 210 from its original position in a direction towards the sensor 240 and positions the sensor target 230 in operative sensing alignment therewith. In the instant invention, in this operative alignment, the face surface of the magnetic head 232 of the sensor target 230 is disposed a predetermined distance 241 from the face surface of the sensor 240. Movement of the member 210 towards the sensor 240 compresses the compressible resilient means 250. When the force-producing chain 37 is let-up during handbrake release, the tension thereon and the resulting force onto the first portion 212 cease to exist enabling the member 210 to move, by way of the expanding compressible resilient means 250, in an opposite direction to the original position and removing the sensor target 230 from the operative sensing alignment with the sensor 240. The sensor 240 is set to generate a control signal in response to either sensing (being normally open) or not sensing (being normally closed) the sensor target 230 depending on a particular application of the railroad handbrake 10. It is presently preferred to generate the control signal when the sensor target 230 is sensed by the sensor 240, thus indicating that the railcar brakes (not shown) are set or are "ON". The sensor 240 is electrically connected to a control system (not shown) adapted to process the generated control signal. The sensor 240 may be directly coupled to a control system (not shown), and preferably, there is a connector 236 that is operatively coupled to each of the sensor 240 and the control system (not shown). The connector 236 may be of the type as manufactured by ITT Corporation of White Plaines, N.Y. under Cannon brand, Part Number MS3470W12-3P.

Figure 1:
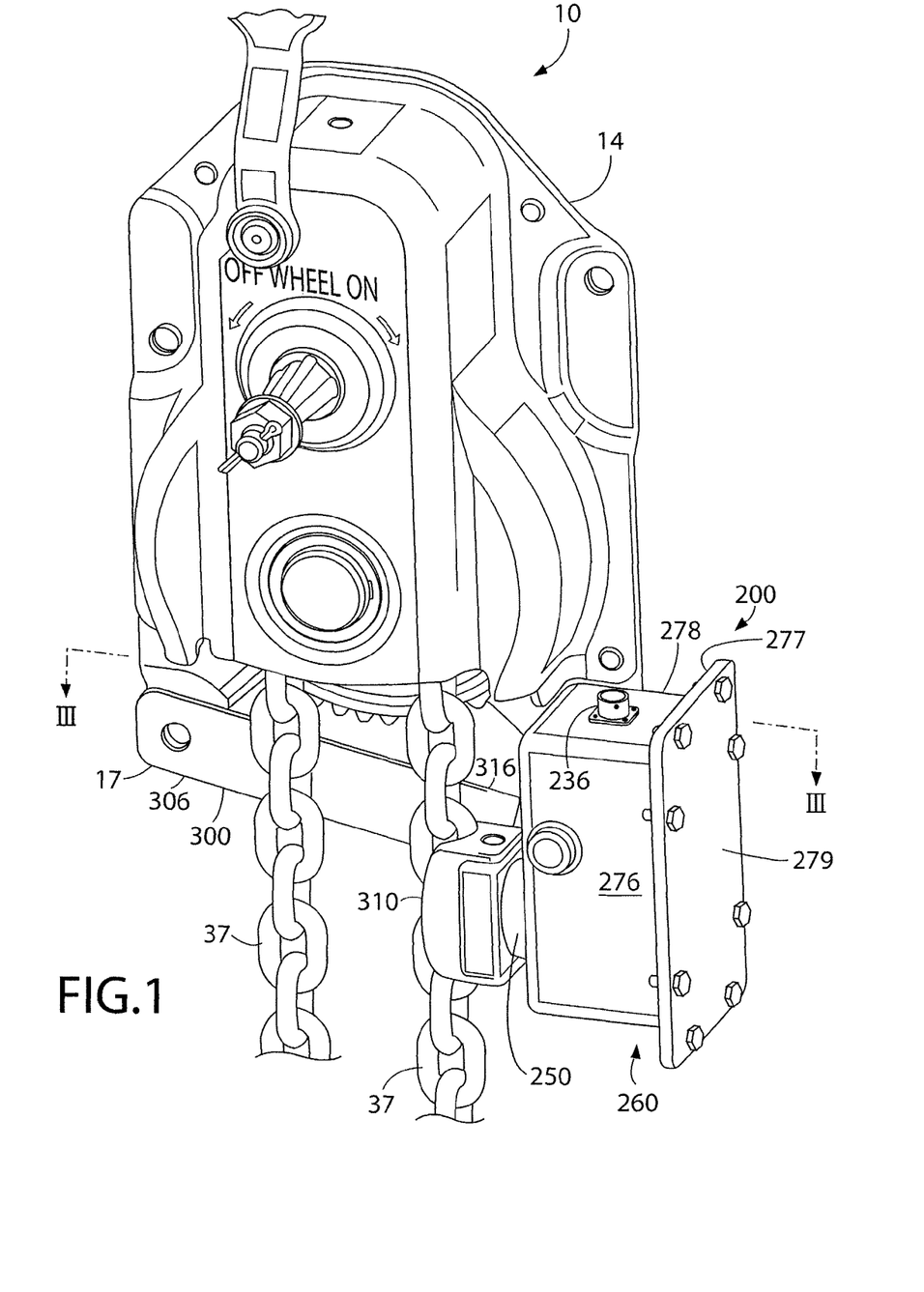
FIG. 1 is a front perspective view of a device for sensing condition of a force-producing chain of a railroad handbrake.

To facilitate installation of the device 200 and minimize installation costs, particularly on the railroad handbrakes 10 presently in use, there is provided a mounting member, generally designated as 260, and means, generally designated as 290, for mounting the mounting member 260 in a stationary position, preferably to one bottom corner, referenced by numeral 15a in FIG. 1, of the housing 14, although the device 200 can be also mounted within the housing 14. The sensor 240 is then stationary secured to the mounting member 260 and the second portion 220 is mounted on the mounting member 260 for reciprocal movement in the substantially linear direction. Furthermore, the compressible resilient means 250 is caged between the rear surface 214 of the first portion 212 and the mounting member 260.

Although, such mounting member 260 may have any shape, it is illustrated and described in the instant invention as a generally closed hollow enclosure having a hollow body 261 open at one end thereof, with an aperture 270 formed through a chain facing wall 262 of the body 261. The aperture 270 is sized so as to mount the second portion 220 of the member 210 for the reciprocal movement. Such hollow body 261 may have an abutment 272 disposed on and secured to an inner surface 264 of the chain facing wall 262 with the aperture 270 being further formed through a thickness of the abutment 272. Finally, to facilitate reciprocal motion of the member 210, a lubricating liner 280 is provided and has an outer surface 282 thereof engaging a periphery 274 of the aperture 270 and having an inner surface 284 thereof disposed in a generally abutting operative engagement with a peripheral surface 224 of the second portion 220 of the member 210. The elongated second portion 220 is prevented from unintentional movement past the outer surface 266 of the chain facing wall 262 of the body 261 by way of a conventional retaining ring or clip 288 mounted near the distal end 226 of the elongated second portion 220.

The body 261 may be adapted with a peripheral flange 277 so that an open end of the body 261 can be closed with a cover member 279 being fastened to the flange 277, although any other attachment means, including but not limited to a snap in/on feature of the cover 277 are also contemplated.

The mounting means 290 includes a second aperture 292 formed through a pair of spaced apart opposed walls 276, 278 of the body 261 in general alignment with the aperture 17 formed through the bottom corner 15a of the housing 14. Walls 276, 278 are essentially disposed generally perpendicular to the chain facing wall 262. The body 261 may be adapted with an optional elongated member 294 extending between inner surfaces of the walls 276, 278, wherein the second aperture 292 is then formed through the length of the optional elongated member 294.

Figure 2:
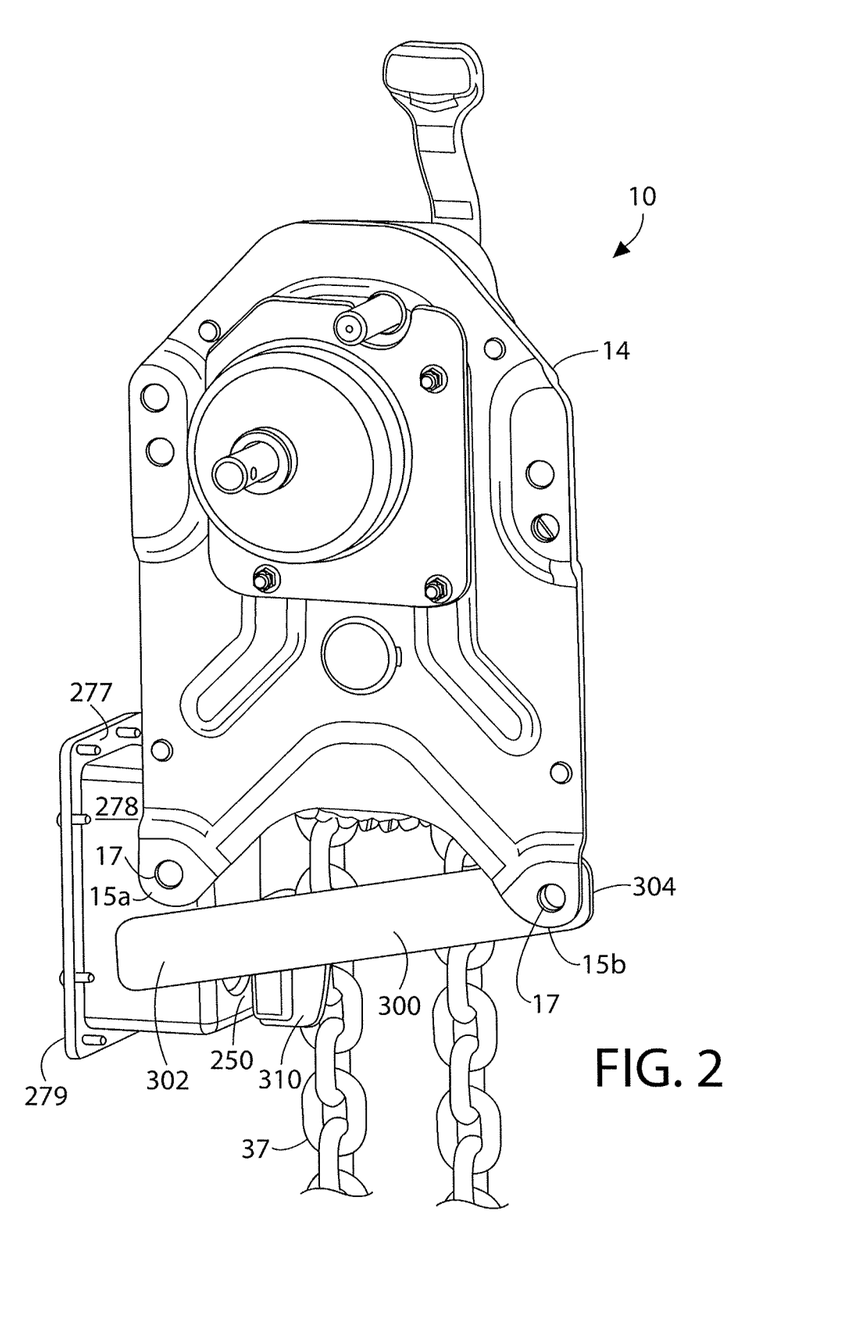
FIG. 2 is a rear perspective view of the device of FIG. 1.

An optional elongated brace 300 may be provided to facilitate mounting of the enclosure 260. Such optional elongated brace 300 may have a proximal end 302 thereof disposed on and secured to an outer surface of the enclosure 260 and having a distal end 304 thereof positioned for engagement with an opposed bottom corner 15b of the housing 14. The distal end 304 has an aperture 306 formed through a thickness thereof and aligned with the aperture 17 formed through the opposed bottom corner 15b of the housing 14.

Finally, a unitary, one-piece chain guide 310 is preferably provided by being disposed on and secured to the member 210. Particularly, the chain guide 310 includes a chain-engaging surface 312 having each of a convex shape in a generally vertical plane when the device 200 is mounted adjacent the railroad handbrake 10 and a concave shape in a generally horizontal plane. An opposed surface 314 of the chain guide 310 is shaped and sized so as to abuttingly engage the front surface 216 of the first portion 212 of the member 210. Two mounting flanges 316 are spaced apart in the generally vertical plane and extend from the opposed surface 314 of the chain guide 210 towards the sensor 240 and in operative abutting engagement with the end of the first portion 212. Finally, there is chain guide securing means including a pair of apertures 318. Each of the pair of apertures 318 is formed through a thickness of a respective mounting flange 316 and operatively receives therewithin a projection 216 depending from each end surface of the first portion 212. Preferably, the chain guide 310 is manufactured from a self-lubricating material. Although, it is contemplated that the member 210 may be manufactured from such self-lubricating material and further having front surface 216 thereof shaped substantially identical to the chain-engaging surface 312 of the chain guide 310. When the member 210 is manufactured from such self-lubricating material, the lubricating liner 280 will become at least optional if not eliminated from the device 200 in its entirety.

To mount the sensor 240 of the presently preferred embodiment, there is provided a generally L-shaped bracket 244 having one leg thereof secured either by fastening, welding or any other suitable process to an interior surface of the enclosure 260 and, more particularly, to the inner surface of the body 261. The externally threaded body of the sensor 240 is fastened to the opposite leg of the generally L-shaped bracket 244 by way of threaded nuts 246 that also permit adjustment of the distance 241.

Thus, the instant invention provides an economical solution to identifying when the railcar brakes have been at least partially set. Furthermore, this solution can be easily implemented as a field retrofit on the railroad handbrakes already in use.

Although, the instant invention has been illustrated and described in combination with a railroad handbrake taught in U.S. Pat. No. 4,368,648, it will be apparent to those skilled in the art, that the instant invention may be applied to other railroad handbrakes having a housing and a force-producing chain extending therefrom. For example, such other railroad handbrake is taught in U.S. Pat. No. 4,714,142 issued to Shepherd, or in U.S. Pat. No. 7,757,825 issued to Michel, or in U.S. Pat. No. 7,878,309 issued to Michel et al. Teachings of U.S. Pat. No. 4,714,142, U.S. Pat. No. 7,757,825 and U.S. Pat. No. 7,878,309 are incorporated into this document by reference thereto.

It will be further apparent to those skilled in the art, that the present invention may be applied to other apparatuses that employ a chain or any other elongated force-producing members, such as belts, cords and the like, for the purpose of determining whether or not the tension is present in such force-producing member. By way of an example only, the device 200 may replace electric switches 37, 38 and at least a portion of the hydraulic switches 45, 36 taught in U.S. Pat. No. 6,029,798 issued to Miller and whose teachings are incorporated into this document by reference thereto.

Figure 4:
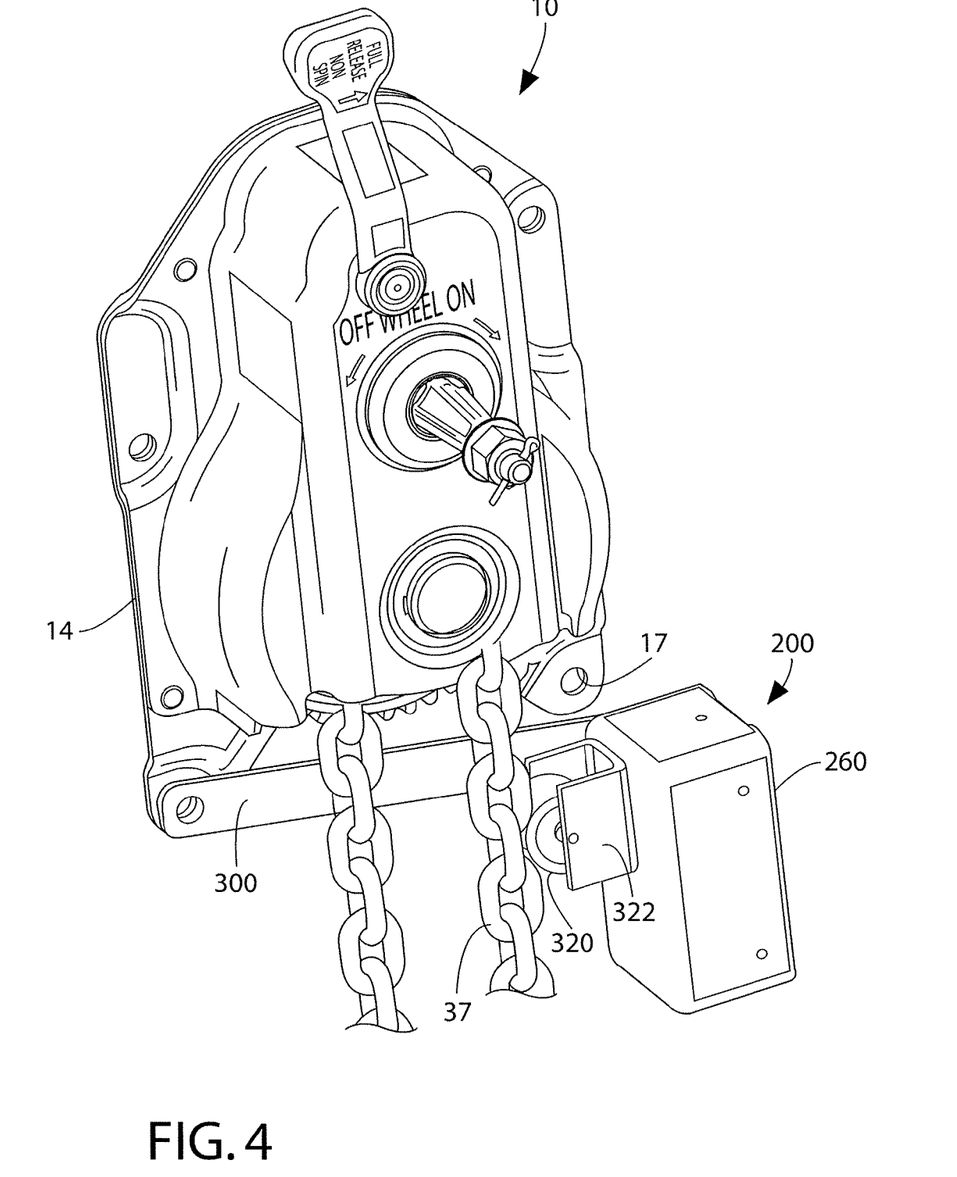
FIG. 4 is another front perspective view of the device of FIG. 1.

Furthermore, the first portion 212 can be replaced with a rotating wheel 320 so as to facilitate engagement with the force-producing chain 37, as best shown in FIG. 4. For example, the first portion 212 may be provided as simple U-shaped member 322 with the wheel 320 mounted for rotation in a conventional manner therewithin. The compressible resilient means 250 may be then positioned to abut the back surface of the U-shaped member 322. The wheel 320 may have a concave peripheral surface for engagement with the force-producing chain 37 or the chain guide 310 may be adapted for mounting onto the wheel 320.

Although the sensor 240 has been shown and described as a non-contact type sensor, it may be provided as a limit switch, for example lever actuated, wherein the sensor target 230 will either depress the lever and actuate the switch during at least partial handbrake application or release the lever during handbrake release. The sensor 240 may be also a conventional load cell type device engageable with the sensor target 230 and outputting a value proportional to the pressure applied by the sensor target 230 thereonto, the pressure representative of the tension in the force-producing chain 37. In such applications, the sensor target does not have to have magnetic characteristic and can be a simple abutment/projection depending from the elongated second portion 220 and further being integrally formed therewith.

It has been found that a single member 210 in combination with a single sensor 240 are sufficient for providing control signal, although it is contemplated that more than one member 210 and one sensor 240 can be provided within one device 200 or even that more than one device 200 can be used. It is also contemplated that the device 200 may be mounted to the railcar structure (not shown) in a position to sense tension within the force-producing chain 37.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. In combination with a railroad handbrake having a housing and a force-producing chain extending from said housing for connection to railcar brake rigging, a device for sensing a tension attainment on said force-producing chain, said device comprising:
    (a) a member mounted adjacent to a bottom end of said housing for a substantially horizontal linear movement during handbrake application and release; and
    (b) means for sensing said substantially linear movement of said member.

2. The combination of claim 1, wherein said means includes each of a sensor mounted in a stationary position and a sensor target disposed on and secured to an end of said member, said sensor target being selectively positioned in an operative alignment with said sensor during said substantially linear movement of said member.

3. The combination of claim 2, further comprising:
    (a) a compressible resilient means mounted between a portion of said member and a portion of a stationary structure;
    (b) whereby attainment of a predetermined tension on said force-producing chain moves said member from its original position in a direction towards said sensor and positions said sensor target in operative sensing alignment therewith; and
    (c) whereby absence of said predetermined tension on said force-producing chain causes said compressible resilient means to move said member in an opposite direction back to said original position and removes said sensor target from said operative sensing alignment with said sensor.

4. A tension sensing device comprising:
(a) a sensor mounted in a stationary position;
(b) a member mounted for a reciprocal movement in a substantially linear direction relative to said sensor, said member including each of a first portion having a rear surface disposed so as to face said sensor and an opposed front surface and a second portion having a proximal end thereof disposed on and secured to said rear surface of said first portion, said second portion extending outwardly from said rear surface generally perpendicular thereto;
(c) a sensor target disposed on and secured to a distal end of said second portion;
(d) a compressible resilient means mounted between said rear surface of said first portion and a portion of a stationary structure;
(e) whereby attainment of a predetermined tension in a force-producing elongated member moves the force-producing elongated member from its original position in a direction towards said sensor and positions said sensor target in operative sensing alignment therewith; and
(f) whereby absence of said predetermined tension in the force-producing elongated member causes said compressible resilient means to move the force-producing elongated member in an opposite direction back to said original position and removes said sensor target from said operative sensing alignment with said sensor.

5. The device of claim 4, wherein said sensor set to generate a control signal in response to either sensing or not sensing said sensor target.

6. In combination with a railroad handbrake having a housing and a force-producing chain extending from said housing for connection to railcar brake rigging, a device for sensing a tension attainment on said force-producing chain, said device comprising:
(a) a sensor mounted in a stationary position adjacent a bottom end of said housing;
(b) a member mounted for a reciprocal movement in a substantially linear direction relative to said sensor, said member including each of a first portion having a rear surface disposed so as to face said sensor and an opposed front surface and a second portion having a proximal end thereof disposed on and secured to said rear surface of said first portion, said second portion extending outwardly from said rear surface generally perpendicular thereto;
(c) a sensor target disposed on and secured to a distal end of said second portion;
(d) a compressible resilient means mounted in abutting engagement with at least said rear surface of said first portion;
(e) whereby take-up of said force-producing chain during at least partial handbrake application moves said member from its original position in a direction towards said sensor and positions said sensor target in operative sensing alignment therewith; and
(f) whereby let-up of said force-producing chain during handbrake release causes said compressible resilient means to move said member in an opposite direction back to said original positions and removes said sensor target from said operative sensing alignment with said sensor.

7. The combination, according to claim 6, wherein said device includes a mounting member, wherein said sensor is secured to said mounting member, wherein said second portion is mounted on said mounting member for said reciprocal movement in said substantially linear direction and wherein said compressible resilient means is caged between said rear surface of said first portion and a portion of said mounting member.

8. The combination, according to claim 7, wherein said mounting member defines a generally closed hollow enclosure having an aperture formed through a chain-facing wall thereof.

9. The combination, according to claim 8, wherein said generally closed hollow enclosure includes a hollow body open at one end thereof and a cover attached to said hollow body in a position to close said open end thereof.

10. The combination, according to claim 9, wherein said device further includes a lubricating liner having an outer surface thereof engaging a periphery of said aperture and having an inner surface thereof disposed in a generally abutting engagement with a peripheral surface of said second portion of said member, said inner surface is so sized that said second portion is mounted for said reciprocal movement within said lubricating liner.

11. The combination, according to claim 8, wherein said generally closed hollow enclosure includes an abutment depending from an inner surface of said chain-facing wall and wherein said aperture extends through a thickness of said abutment.

12. The combination, according to claim 7, wherein said mounting member includes means for mounting said mounting member to at least said railroad handbrake.

13. The combination, according to claim 12, wherein said means includes an aperture formed through at least another wall portion of said mounting member and an elongated brace extending outwardly therefrom.

14. The combination, according to claim 6, wherein said first portion, said second portion and said sensor target are formed integral with each other and wherein said member is a unitary one-piece member.

15. The combination, according to claim 6, wherein said first portion of said member is elongated in a generally vertical plane when said device is mounted adjacent said railroad handbrake.

16. The combination of claim 6, further including a chain guide disposed on and secured to said member.

17. The combination, according to claim 16, wherein said member includes a pair of projections, each of said pair of projections depending from a generally horizontally disposed end surface of said first portion and wherein said chain guide includes:
(a) a chain engaging surface having each of a convex shape in a generally vertical plane when said device is mounted adjacent the railroad handbrake and a concave shape in a generally horizontal plane;
(b) an opposed surface shaped and sized so as to abuttingly engage said front surface of said first portion of said member;
(c) a pair of mounting flanges spaced apart in said generally vertical plane and extending from said opposed surface of said chain guide; and
(d) a pair of apertures, each of said pair of formed through a thickness of a respective mounting flange and operatively receiving therewithin a respective one of said pair of projections of said first portion of said member.

18. The combination, according to claim 17, wherein said chain guide is manufactured from a self-lubricating material.

19. In combination with a railroad handbrake having a housing and a force-producing chain extending from said housing for connection to railcar brake rigging, a device for sensing a tension condition of said force-producing chain, said device comprising:

(a) a generally hollow enclosure body secured in a stationary position to one bottom corner of said housing, said body having each of an open end, an abutment disposed on and secured to an inner surface of a chain-facing wall, a first aperture formed through a thickness of each of said chain-facing wall and said abutment and a second aperture formed through a pair of spaced apart opposed walls of said housing, said pair of opposed walls disposed generally perpendicular to said chain-facing wall, said second aperture disposed in general alignment with an aperture formed through said one bottom corner of said housing;

(b) a cover member secured to said body in a position to close said open end thereof;

(c) an elongated brace having a proximal end thereof disposed on and secured to an outer surface portion of said body and having a distal end thereof positioned for engagement with an opposed bottom corner of said housing, said distal end having an aperture formed through a thickness thereof and aligned with an aperture formed through said opposed bottom corner of said housing;

(d) a lubricating liner having an outer surface thereof engaging a periphery of said first aperture;

(e) an L-shaped bracket secured to an inner surface of one of said opposed walls of said body;

(f) a sensor securely attached onto said L-shaped bracket generally transverse to a direction of said force-producing chain;

(g) a unitary one-piece member mounted for a reciprocal movement in a substantially linear direction relative to said sensor, said member including:
  i. a first portion having a substantially flat rear surface disposed so as to face said sensor, an opposed substantially flat front surface, a top end and a bottom end,
  ii. a pair of projections, each of said pair of projections depending from a respective top or bottom end,
  iii. an elongated second portion having a proximal end thereof disposed generally centrally on and secured to said rear surface, said second portion extending outwardly from said rear surface generally perpendicular thereto, said second portion having a peripheral surface thereof disposed in a generally abutting engagement with an inner surface of said lubricating liner, and
  iv. a threaded bore axially disposed in a distal end of said elongated second portion;

(h) a sensor target having each of a magnetic head and a threaded stem axially extending therefrom, said threaded stem operatively engaging said threaded bore of said elongated second portion;

(i) a compressible resilient elastomer caged between said rear surface of said first portion of said member and an outer surface of said chain facing wall of said body, said compressible resilient elastomer having a center aperture axially formed therethrough, said center aperture is sized so as to pass said elongated second portion of said member therethrough;

(j) a unitary one-piece chain guide manufactured from a self-lubricating material and including:
  i. a chain engaging surface having each of a convex shape in a generally vertical plane and a concave shape in a generally horizontal plane when said device is installed for sensing said tension condition of said force-producing chain;
  ii. an opposed surface shaped and sized so as to abuttingly engage said front surface of said first portion of said member,
  iii. a pair of mounting flanges spaced apart in said generally vertical plane and extending from said opposed surface of said chain guide, and
  iv. a pair of apertures, each of said pair of apertures formed through a thickness of a respective mounting flange and operatively receiving therewithin a respective one of said pair of projections of said first portion of said member;

(k) a connector operatively connecting said sensor to a control system;

(l) whereby take-up of said force-producing chain during at least partial handbrake application attains a predetermined tension thereon and moves said member from its original position in a direction towards said sensor and positions said sensor target in operative sensing alignment therewith;

(m) whereby let-up of said force-producing chain during handbrake release causes said compressible resilient elastomer to move said member in an opposite direction back to said original positions and remove said sensor target from said operative sensing alignment with said sensor; and (n) whereby said sensor generates a control signal in response to sensing or not sensing said sensor target.

20. A method for sensing at least partial tension attainment on a force-producing chain of a railroad handbrake, said method comprising the steps of:

(a) mounting a member for each of an engagement with said force-producing chain of said railroad handbrake and a reciprocal movement in a generally horizontal linear direction;

(b) mounting a sensor in proximity to a bottom end of a housing of said railroad handbrake in a position to sense said generally linear movement of said member;

(c) moving said member in said generally horizontal linear direction; and (d) sensing, with said sensor mounted in step (b), said generally horizontal linear movement of said member, mounted in step (a) during one of at least partial handbrake application and handbrake release.

21. The method, according to claim 20, wherein step (c) includes a step of applying, by said force-producing chain, a force onto said member.

22. In a combination with a railroad handbrake having a housing and a force-producing chain extending from said housing for connection to railcar brake rigging, a device for sensing a tension condition in said force-producing chain, said device comprising:

(a) a member mounted adjacent to a bottom end of said housing for a substantially linear movement during handbrake application and release;

(b) a sensor mounted in a stationary position;

(c) a sensor target disposed on and secured to an end of said member, said sensor target being selectively positioned in an operative alignment with said sensor during said substantially linear movement of said member;

(d) a compressible resilient means mounted between a portion of said member and a portion of a stationary structure;

(e) whereby attainment of a predetermined tension on said force-producing chain moves said member from its original position in a direction towards said sensor and positions said sensor target in operative sensing alignment therewith; and (f) whereby absence of said predetermined tension on said force-producing chain causes said compressible resilient means to move said member in an opposite direction back to said original position and removes said sensor target from said operative sensing alignment with said sensor.

23. The combination of claim 22, wherein said stationary structure defines a generally closed hollow enclosure having an aperture formed through a chain-facing wall thereof, said aperture sized to pass another portion of said member therethough.

* * * * *